US012120155B2

(12) United States Patent
Naidu et al.

(10) Patent No.: US 12,120,155 B2
(45) Date of Patent: Oct. 15, 2024

(54) METHOD AND APPARATUS FOR PROVIDING MEDIA RESOURCES IN A COMMUNICATION NETWORK

(71) Applicant: AT&T Intellectual Property I, L.P., Atlanta, GA (US)

(72) Inventors: Lakshminarashimhan Naidu, Pearland, TX (US); Michael Taylor, Leander, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

(21) Appl. No.: 17/825,239

(22) Filed: May 26, 2022

(65) Prior Publication Data

US 2022/0286485 A1 Sep. 8, 2022

Related U.S. Application Data

(63) Continuation of application No. 16/751,721, filed on Jan. 24, 2020, now Pat. No. 11,374,984, which is a
(Continued)

(51) Int. Cl.
*H04L 65/1069* (2022.01)
*H04L 61/4511* (2022.01)
(Continued)

(52) U.S. Cl.
CPC ...... *H04L 65/1069* (2013.01); *H04L 61/4511* (2022.05); *H04L 65/1016* (2013.01);
(Continued)

(58) Field of Classification Search
CPC ............ H04L 65/1069; H04L 61/4511; H04L 65/1016; H04L 65/1063; H04L 65/1104;
(Continued)

(56) References Cited

U.S. PATENT DOCUMENTS 8,014,340 B2 9/2011 Tidwell et al.
8,457,139 B2 6/2013 Ayyar et al.
(Continued)

OTHER PUBLICATIONS

Adensamer, Ray, "Personalized VoLTE and Mobile Video Services", Radisys White Paper; Sep. 2013, pp. 1-13, 1-13.

*Primary Examiner* — Thai Nguyen
(74) *Attorney, Agent, or Firm* — Guntin & Gust, PLC; Kenneth S. Kwan

(57) ABSTRACT

Aspects of the subject disclosure may include, for example, providing a request associated with a call session to a server, wherein the request includes capability information associated with user equipment. A codec is identified according to the capability information to obtain an identified codec, which facilitates media service to the user equipment. The media service is accessed from a media resource function, which in turn, is accessed by the server responsive to the identified codec. An operable resource identifier is identified responsive to a search of a codec table, wherein the server accesses the operable resource identifier associated with the media resource function from a domain name server responsive to the resource identifier not being available at the codec table. Other embodiments are disclosed.

20 Claims, 5 Drawing Sheets

Related U.S. Application Data continuation of application No. 16/052,678, filed on Aug. 2, 2018, now Pat. No. 10,581,930, which is a continuation of application No. 15/446,122, filed on Mar. 1, 2017, now Pat. No. 10,069,875.

(51) Int. Cl.

| | | |
|---|---|---|
| *H04L 65/1016* | (2022.01) | |
| *H04L 65/1063* | (2022.01) | |
| *H04L 65/1104* | (2022.01) | |
| *H04L 65/403* | (2022.01) | |
| *H04L 65/70* | (2022.01) | |
| *H04L 61/45* | (2022.01) | |
| *H04L 61/4557* | (2022.01) | |
| *H04L 101/38* | (2022.01) | |
| *H04L 101/385* | (2022.01) | |
| *H04M 7/00* | (2006.01) | |
| *H04W 8/24* | (2009.01) | |
| *H04W 84/04* | (2009.01) | |

(52) U.S. Cl.
CPC ...... *H04L 65/1063* (2013.01); *H04L 65/1104* (2022.05); *H04L 65/403* (2013.01); *H04L 65/70* (2022.05); *H04L 61/4557* (2022.05); *H04L 61/457* (2022.05); *H04L 2101/38* (2022.05); *H04L 2101/385* (2022.05); *H04M 7/0072* (2013.01); *H04W 8/24* (2013.01); *H04W 84/042* (2013.01)

(58) Field of Classification Search
CPC ... H04L 65/403; H04L 65/70; H04L 61/4557; H04L 61/457; H04L 2101/38; H04L 2101/385; H04M 7/0072; H04W 8/24; H04W 84/042

See application file for complete search history.

(56) References Cited

U.S. PATENT DOCUMENTS

| | | |
|---|---|---|
| 9,083,784 B2 | 7/2015 | Ku et al. |
| 9,094,438 B2 | 7/2015 | Shatsky |
| 9,118,593 B2 | 8/2015 | Kunarathnam et al. |
| 9,319,435 B2 | 4/2016 | Patel et al. |
| 9,432,408 B2 | 8/2016 | Kristiansson |
| 9,432,414 B2* | 8/2016 | Belling .................. H04L 45/00 |
| 2005/0060411 A1 | 3/2005 | Coulombe et al. |
| 2008/0056235 A1* | 3/2008 | Albina .................. H04M 7/123 370/352 |
| 2008/0212499 A1* | 9/2008 | Maes .................. H04L 65/1094 370/265 |
| 2008/0301747 A1 | 12/2008 | Yan et al. |
| 2012/0275432 A1 | 11/2012 | Lei et al. |
| 2012/0327779 A1* | 12/2012 | Gell .................. H04L 47/6275 370/235 |
| 2013/0013780 A1 | 1/2013 | Yamagishi |
| 2016/0021336 A1 | 1/2016 | Abbott et al. |
| 2016/0277274 A1 | 9/2016 | Burman |
| 2016/0366189 A1 | 12/2016 | Hart |
| 2016/0381093 A1 | 12/2016 | Novo Diaz et al. |
| 2018/0255109 A1 | 9/2018 | Naidu et al. |
| 2018/0343287 A1 | 11/2018 | Naidu et al. |
| 2020/0162523 A1 | 5/2020 | Naidu et al. |

\* cited by examiner

METHOD AND APPARATUS FOR PROVIDING MEDIA RESOURCES IN A COMMUNICATION NETWORK

CROSS REFERENCE TO RELATED APPLICATIONS

This application is a continuation of U.S. patent application Ser. No. 16/751,721 filed on Jan. 24, 2020, which is a continuation of U.S. patent application Ser. No. 16/052,678 filed on Aug. 2, 2018, now U.S. Pat. No. 10,581,930, which is a continuation of U.S. patent application Ser. No. 15/446,122 filed on Mar. 1, 2017, now U.S. Pat. No. 10,069,875. All sections of the aforementioned application(s) and/or patent(s) are incorporated herein by reference in their entirety.

FIELD OF THE DISCLOSURE

The subject disclosure relates to a method and apparatus for providing media resources in a communication network.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
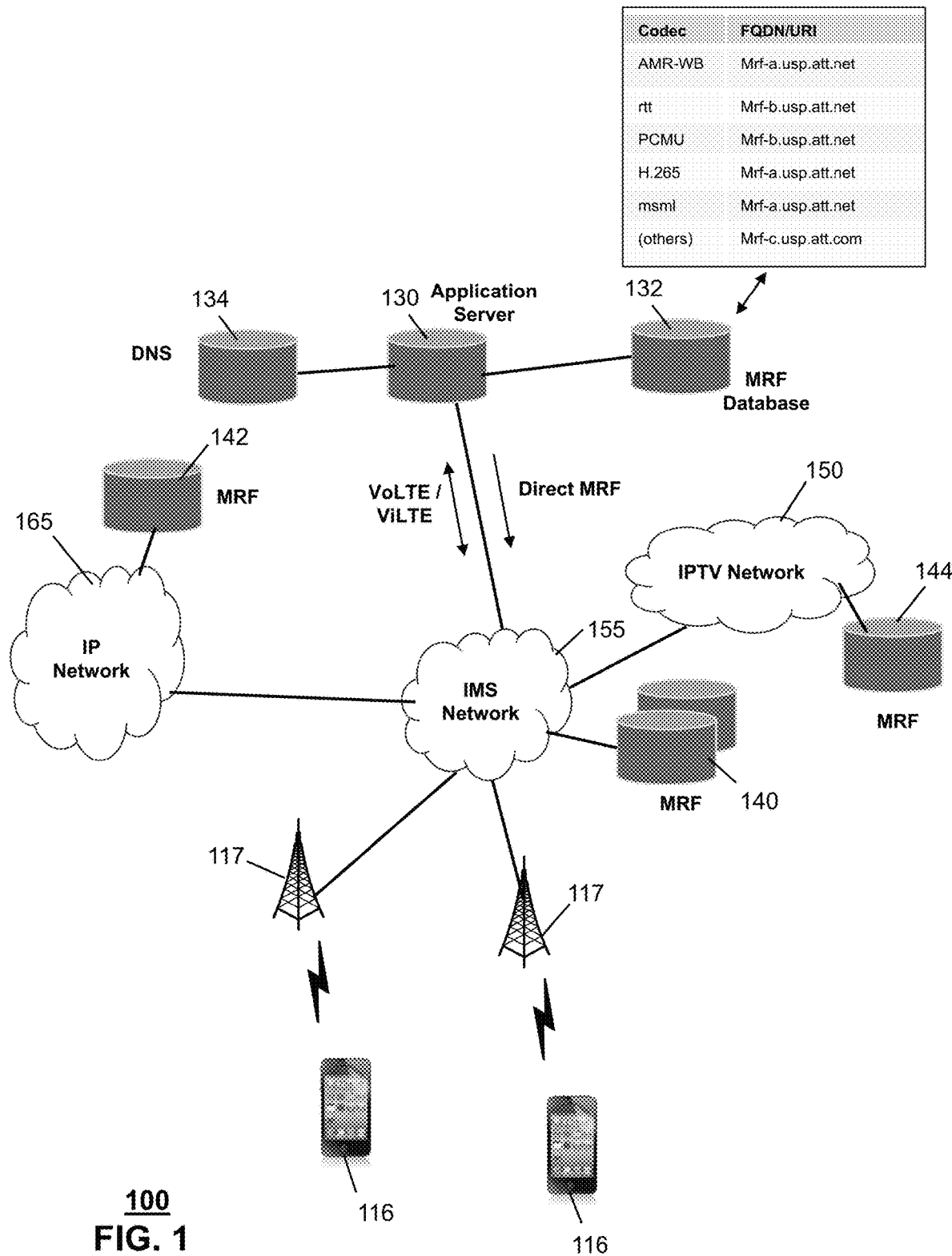
FIG. 1 depicts an illustrative embodiment of a system that can be utilized for providing media resources to user equipment in a communication network.

The subject disclosure describes, among other things, illustrative embodiments for providing a Media Resource Function (MRF) to support IP-based multimedia services for call sessions in a communication system, such as a Long-Term Evolution (LTE) system. Voice-over-LTE (VoLTE), Video-over-LTE (ViLTE), or video streaming services may use MRF services that provide processing of real-time audio and/or video streams within IP-based communication networks, such as an IP Multimedia Subsystems (IMS).

An Application Server (AS) can receive a transport protocol message associated with a call session and can determine if the transport protocol message includes session attributes and media description information. The AS can determine an optimal codec required for providing media services to a communication device involved in the call session. The AS can access a database that associates available codecs with resource identifiers of known MRF services available within the IMS system. If a resource identifier for a MRF service including the needed codec is not found, then the AS can query a Domain Name Server (DNS) to obtain the resource identifier. The AS can then use the resource identifier to transmit a request to the MRF service to provide media services to the communication device. Other embodiments are described in the subject disclosure.

One or more aspects of the subject disclosure include a method, can include receiving, by a processing system including a processor, a transport protocol message associated with user equipment associated with a call session, and, in turn, detecting, by the processing system, session description protocol information in a header of the transport protocol message. The method can also include determining, by the processing system, a session attribute from the session description protocol information, and, in turn, determining, by the processing system, a media description from the session description protocol information. The session attribute can include capability information associated with the user equipment. The method can include determining, by the processing system, a first codec to provide a first media service to the user equipment associated with the call session according to the session attribute and the media description. Responsive to determining the first codec, the method can include searching, by the processing system, a codec table to obtain a first resource identifier associated with a first media resource function to provide the first media service according to the first codec and, in turn, transmitting, by the processing system, a first request to the first media resource function to provide the first media service to the user equipment associated with the call session. If the first resource identifier associated with the first codec is not available at the codec table, then the method can include accessing, by the processing system, the first resource identifier associated with the first media resource function from a domain name server.

One or more aspects of the subject disclosure include a machine-readable storage medium, including executable instructions that, when executed by a processing system including a processor, facilitate performance of operations, including receiving a transport protocol message associated with user equipment associated with a call session, determining a session attribute and a media description from the transport protocol message, and determining a first codec to provide a first media service to the user equipment associated with the call session according to the session attribute and the media description. The session attribute can include capability information associated with the user equipment. Responsive to determining the first codec, the operations can include searching a codec table to obtain a first resource identifier associated with a first media resource function to provide the first media service according to the first codec and, in turn, transmitting a first request to the first media resource function to provide the first media service to the user equipment associated with the call session. If the first resource identifier associated with the first codec is not available at the codec table, then the operations can also include accessing the first resource identifier associated with the first media resource function from a domain name server.

One or more aspects of the subject disclosure include a device including a processing system including a processor, and a memory that stores executable instructions that, when executed by the processing system, facilitate performance of operations. The processing system, responsive to executing the executable instruction, can perform operations for determining from a transport protocol message, capability information associated with user equipment associated with a call session and determining a first codec to provide a first media service to the user equipment associated with the call session according to the capability information. Responsive to determining the first codec, the operations can include searching a codec table to obtain a first resource identifier associated with a first media resource function to provide the first media service according to the first codec and, in turn, transmitting a first request to the first media resource function to provide the first media service to the user equipment associated with the call session. If the first resource identifier associated with the first codec is not available at the codec table, the operations can also include accessing the first resource identifier associated with the first media resource function from a domain name server.

Figure 2:
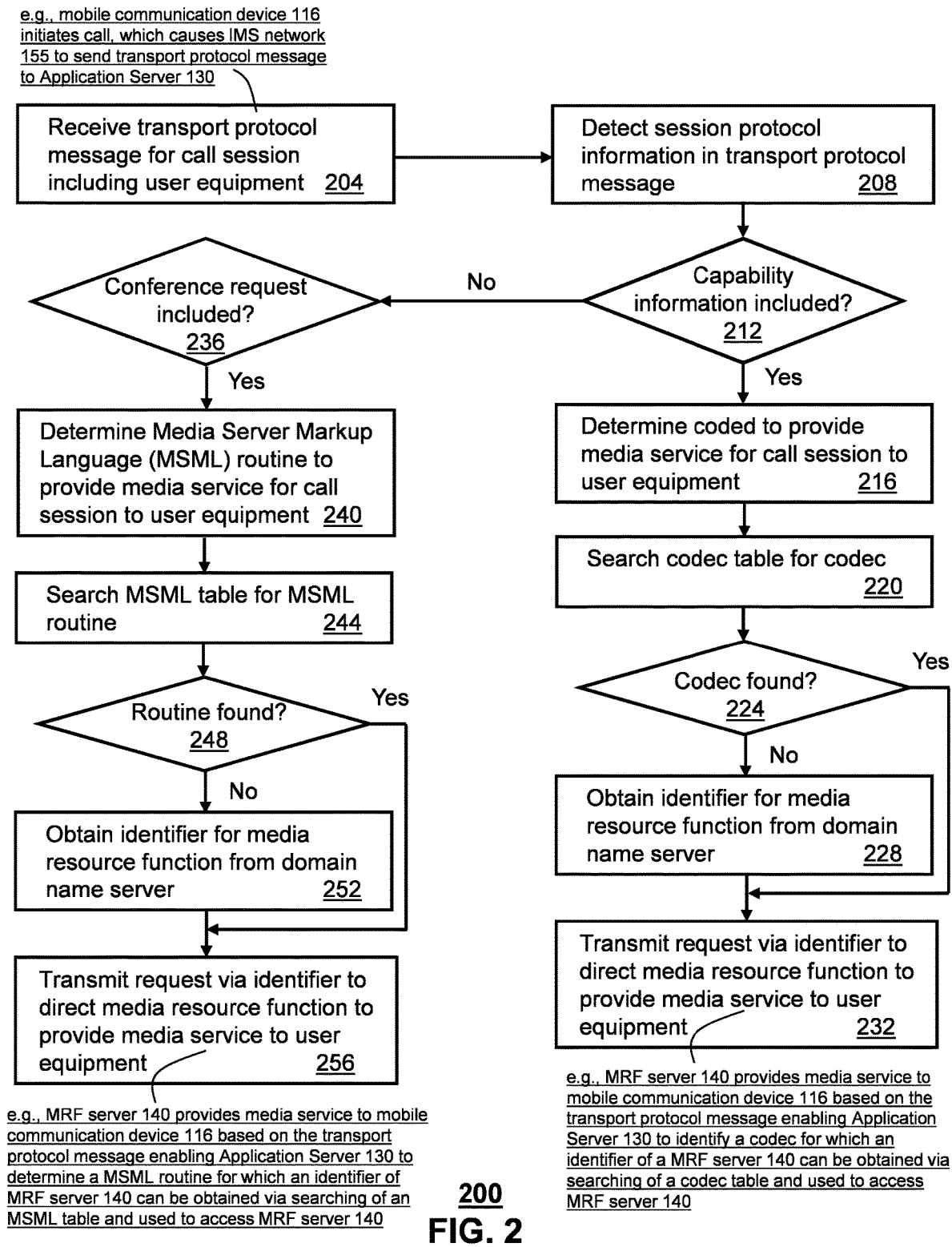
FIG. 2 depicts an illustrative embodiment of a method used in portions of the system described in FIG. 1.

FIG. 1 depicts an illustrative embodiment of a system that can be utilized for providing media services for call sessions and devices. FIG. 2 depicts illustrative embodiments of a method for providing media services. In one embodiment, the system 100 can incorporate a subscription telecommunications service. For example, the subscription telecommunications service can provide communication connectivity for telephony devices, including mobile communication devices 116. In another embodiment, the system 100 can include network connectivity between an Internet IP network 165, an IP Multimedia Subsystem (IMS) network 155, and/or an IP Television (IPTV) network. The system 100 can provide a content-rich communications platform that can include cable, satellite, fiber optic, and/or DSL based media content delivery systems. Available content can be any type of content, such as broadcast television, cable or premium television, video on demand, or pay-per-per view television. The content can be software content, including entire software programs, upgrades to programs, and/or additions to programs. Content can be subscription-based, such as basic cable, premium cable, or movie channel content. The content can be non-subscription-based, such as "free" Internet-based content of over-the-air television content and/or single offers or purchases of content.

In one embodiment, the system 100 can provide IP-based communications services, such as Voice-over-LTE (VoLTE) and/or Video-over-LTE (ViLTE). These voice and video delivery systems can combine traditional voice telephony services with rich media content, including video streaming services. In one embodiment, the system 100 can provide VoLTE and ViLTE services via Application Servers (AS) 130. The AS 130 provide a rich variety of applications for use by smart devices, such as mobile communication devices 116. In one example, a mobile communication device 116 can access the system 100 via a wireless mobility network 117 to initiate a VoLTE calling session to another mobile communication device 116. Initiation of a calling session can cause a Session Initiation Protocol (SIP) message to be generated at the IMS network 155. The SIP message can include information necessary for initiating the call session, including identifiers for the calling and receiving devices 116, which can be used by the IMS network 155 for initiating and routing the call between the mobile communication devices 116. The mobility network 117 can route content to a mobile communication device 116, such as a wireless smart phone, via a cellular, long term evolution (LTE), third generation (3G), and/or fourth generation (4G) wireless networks. In one embodiment, the mobile communication device 116 can route content that is received over the mobility network 117 by, for example, a mobile hotspot Wi-Fi link between the mobile communication device 116 and a computer device 116 or a media device 108.

In one or more embodiments, the IMS network 115 can determine, from the SIP message, that the calling device 116 is requesting a VoLTE or ViLTE call and can select an Application Server 130 for servicing the audio and/or video components of the call. To handle IP-based voice and/or video calls, the Application Server 130 may need to invoke one or more Media Resource Functions (MRF) 140-144 to provide media related functions necessary to the calling session. For example, a VoLTE or ViLTE call session may require media manipulation, such as mixing voice and/or video streams and/or producing audio tones and announcements.

In one or more embodiments, each of the MRF servers 140-144 can include one or more codecs, or coder-encoder technology for processing data streams. When data streams are transmitted over networks, data is typically encoded into a format suitable for efficient and reliable data transfer and, then, decoded after it has been transferred. Many codec types are available, each tailored to specific limitations present at the device and network level. Codecs are implemented as a combination of device hardware and software and are typically reconfigurable, so that a particular device, such as a MRF server 140, can service more than one codec. However, for the sake of efficiency and cost, MRF servers 140-144 will typically only include a subset of the possible codecs that could be used. To further complicate the issue, the user equipment devices, such as the mobile communication devices 116, are often very with respect to codec types due to the hardware, software, and wireless networking constraints faced by the these devices.

If an Application Server 130 invokes a MRF server 140 without knowledge of relationships between the codec capabilities of an end user device, such as a mobile communication device 116, and the codec capabilities of the MRF server 140, then the Application Server 130 may select combinations of data streams that mismatch with the MRF sever 140 and/or mobile communication device 116. Further, with each MRF server 140 selected, the Application Server 130 may be required to seek help from a DNS to obtain the address of what, ultimately, may turn out to be the wrong MRF server 140. In this scenario, the Application Server 130 may be required to perform a "trial and error" process of selecting and deselecting the MRF server 140 and/or codec until a correctly performing codec/media stream/communication device 116 is found. This approach can create a delay in processing VoLTE/ViLTE calls, sometimes in a range of many seconds, which can result in delayed call control setup and/or extreme poor quality especially in ViLTE sessions. This approach can reduce customer satisfaction, while increasing churn rate and customer dissatisfaction.

In one or more embodiments, the IMS network 155 can send a transport protocol message to the Application Server 130. The Application Server 130 can receive the transport protocol message in step 204. The transport protocol message can be associated with a call session, such as a VoLTE or ViLTE session. The transport protocol message can be associated with a data streaming event, such as a request for content from a mobile communication device 116. The transport protocol message can be a SIP message. The transport protocol message can include information describing requirements or capabilities that are needed for successful provision of service to the requesting device. For example, the transport protocol message can include SIP header information that aids the Application Server 130 in selecting a MRF server 140 that meets codec requirements or that is best or most appropriate for providing resources needed for providing media services. The transport protocol message can include header information as well as payload information.

In one or more embodiments, the Application Server 130 can examine header information, such as Session Description Protocol (SDP) information in the transport protocol message, to detect session protocol information in step 208. The SDP information can include any of several types of media attributes and parameters that can be subject to an industry standard. In various embodiments, the SDP information can be included in a header of a SIP message and can include descriptions for the type of media (e.g., video, audio), the transport protocol (e.g., RTP/UDP/IP, H.320), the format of the data (e.g., H.261, video, MPEG video). Generally, the SDP header, or SDP session description, can include a series of descriptive items that can be in the general format of <type>=<value>. For example, one SDP session record can include a record, "s=SDP Seminar," where "s" is a description type for a "session name," and "SDP Seminar" is the particular value associated with this session name. In this case, the record, "s=SDP Seminar," tells the receiving Application Server 130 that the current session name is "SDP Seminar."

The SDP header can include a series of records of this type that can provide information defining the session. Two other particular descriptive items that may illustratively be used, separately or together, to define the codec requirements for a session are the type "m" for "media" records and the type "a" for attributes. The type "m" session record can specify the media type, port, number of ports, transport protocol, and format of the session. For example, the "m" record could read, "m=video 49170/2 RTP/AVP 31." This "m" record would tell the Application Server 130 that the current session includes media that is in the form of video that is received on ports 49170 and 49171 as a first RTP.RTCP pair on ports 49172 and 49173 as a second RTP.RTCP pair, where the transport protocol is RTP/AVP and the format "31" is used. The type "a" session record can specify various attributes. The "a" type record can include variable lengths of data depending on the particular type of attribute. In addition, the "a" record can be contextual, such that its meaning depends, in part, upon other records, such as the "m" record. For example, the "a" record can be directed to the attribute, "rtpmap," which can map an RTP payload type number to an encoding name denoting the payload format to be used. The "rtpmap" attribute can also provide information on clock rate and encoding parameters. For example, the "a" record could read, "rtpmap:98 L16/160000/2." This record defines a dynamic payload type that is 16-bit linear encoded stereo sampled at 16 kHz. If the "m" record defined the content as including audio with RTP protocol, then the "a" record would tell the Application server how the payload audio data is encoded.

In one or more embodiments, the Application Server 130 can analyze the session description information to determine one or more capabilities that are required to provide media services necessary to the call session in step 212. For example, the Application Server 130 can determine the type of media that is being received and transmitted, its transmission protocol, and a mapping between the transmission protocol and an encoding/decoding scheme (with specific parameters) that is needed to make a data stream compatible with the communication device 116 and the intervening network. The Application Server 130 can use this information to determine a codec (encoder or decoder) that is needed for the media service described in the transport protocol message in step 216. For example, the Application Server 130 can determine that a data compression scheme call, "PCMU" (i.e., G.711 compression is required.

In one or more embodiments, the Application Server 130 can select an appropriate MRF server 140 based on the codec that is determined. The Application Server 130 can search a codec table or a MRF Database 132 based on the determined codec in step 220. For example, the MRF Database 132 could include a listing of various codecs and their corresponding MRF servers 140-144. In one embodiment, the MRF servers 140-144 can be include resource identifiers that can be used to access the MRF servers 140-144. The Application Server 130 can present a codec name to the MRF Database 132 and receive a universal resource identifier (URI) for a specific MRF server 140 that can provide this codec for the Application Server 130 to provide a service.

In one or more embodiments, the MRF Database 132 may not include a resource identifier associated with a MRF server 140 for the codec. In this case, the MRF Database 132 will not find a match, in step 224, and can notify the Application Server 130 of the lack of a match. In this case, the Application Server 130 can query a DNS 134 for a resource identifier of a MRF server 140-144 that can provide codec service in step 228. The Application Server 130 can map and select the appropriate MRF server 140 based on the DNS record configuration within the Application Server 130. Once the Application Server 130 has obtained the resource identifier for the desired MRF server 140, the Application Serve 130 can instruct the MRF Database to store this identifier for future use. The Application Server 130 can transmit a request to the selected MRF server 140 as identified by the resource identifier in step 232. The request can direct the MRF server 140 to provide a media service to a mobile communication device 116, such playing an audio tone or announcement or manipulating the media stream. By selecting the proper MRF server 140, without undue delay, VoLTE/ViLTE calls can be processed quickly, often in a range of just milliseconds (instead of seconds), which can result in faster call control setup and better quality service (especially in ViLTE). These features can enhance customer satisfaction, reduce churn rate, and increase overall customer satisfaction and retention.

In one or more embodiments, the Application Server 130 can determine, in step 236, that the SDP header includes a request for a conference, such as a conference call or a broadcast call. In an illustrative example, the SDP header can include an "a" record that includes a type of conference. For example, the record could read, "a=type:moderated," which would indicate that the payload data is associated with a moderated conference call. In this case, the Application Server 130 can determine a Media Server Markup Language (MSML) routine capable of supporting the type of conference, in step 240. For example, a MSML routine capable of supporting a "moderated" conference can be selected. In step 244, the Application Server 130 can provide the selected MSML routing to search the MRF Database 132. If a resource identifier for the MSML routine is not found in the MRF database, in step 248, then the Application Server 130 can query the DNS server 134 for the resource identifier in step 252. The Application Server 130 can direct the selected MRF server 140 for performing the MSML routine in step 256.

Figure 3:
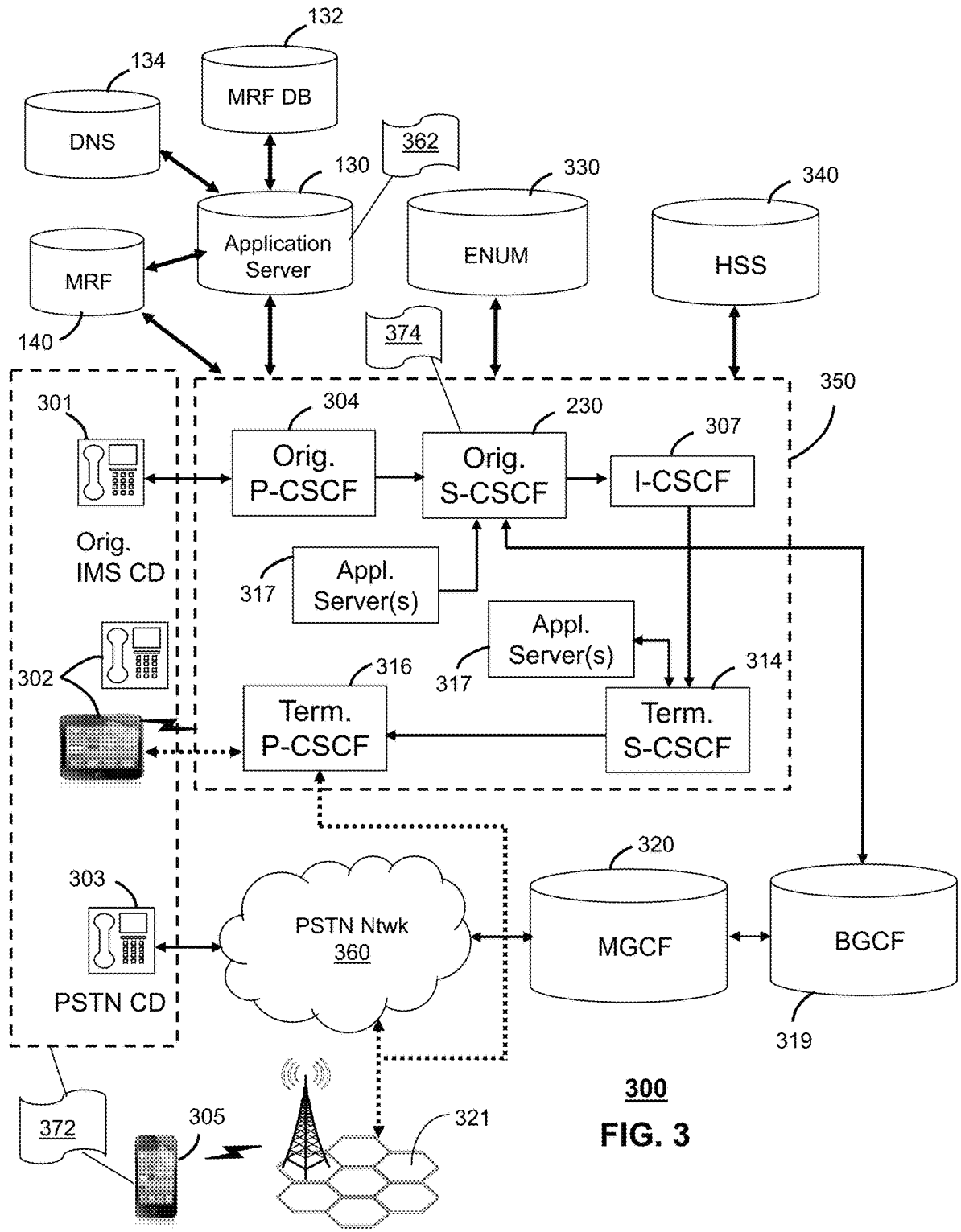
FIG. 3 depicts illustrative embodiments of a communication system that provide media services for use by the system of FIG. 1.

FIG. 3 depicts an illustrative embodiment of a communication system 300 employing an IP Multimedia Subsystem (IMS) network architecture to facilitate the combined services of circuit-switched and packet-switched systems. Communication system 300 can be overlaid or operably coupled with system 100 of FIG. 1 and communication system 300 as another representative embodiment of communication system 300, for using header information in a transport protocol message to select a MRF server for providing a media service to user devices in an IP-based communication system.

Communication system 300 can comprise a Home Subscriber Server (HSS) 340, a tElephone NUmber Mapping (ENUM) server 330, and other network elements of an IMS network 350. The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to one or more application servers (ASs) 317 that can provide a variety of services to IMS subscribers.

For example, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with the multimedia and Internet services.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The Application Server 130 of FIG. 3 can be operably coupled to communication system 300 for purposes similar to those described above. Application Server 130 can perform function 362 and thereby provide media services to the CDs 301, 302, 303 and 305 of FIG. 3 similar to the functions described for Application Server 130 of FIG. 1 in accordance with method 200 of FIG. 2. CDs 301, 302, 303 and 305, which can be adapted with software to perform function 372 to utilize the services of the Application Server 130 similar to the functions described for communication devices 116 of FIG. 1 in accordance with method 200 of FIG. 2. Application Server 130 can be an integral part of the application server(s) 517 performing function 374, which can be substantially similar to function 362 and adapted to the operations of the IMS network 350.

In one illustrative example, the Application Server 130 can be used to provide a High Definition (HD) voice announcement to a VoLTE user via an Adaptive Multi-Rate Wideband codec (AMR WB). In this case, the Application Server 130 needs to play an announcement to the end user as part of the application logic. For example, a terminating user number has moved, did not pay the bill, or so forth. The Application Server 130 can examine the SDP header of an incoming SIP message to check the audio capabilities of the mobile communication device 116. The Application Server 130 can select a MRF server 144, via third party call control (3PCC), which has HD voice capacity (via AMR-WB codec) to play the HD voice announcement to the terminating party. The Application Server 130 can select the MRF server 144 according to the following SIP (signaling) path:

UE←→P-CSCF(SBC)←→S-CSCF←→AS←→MRF (A).

The selected MRF 144 can provide the media service to the communication device 116 according to the following media (bearer) path:

UE←SBC←MRF(A).

In another illustrative example, the Application Server 130 can be used to provide media services to a communication device 116 that only has a Speex codec, with an audio compression format designed for speech and VoIP applications and podcasts. In this case, the Application Server 130 can select a MRF server 142 by selecting the "others" codec in the MRF Database 132 and can use the Fully Qualifed Domain Name (FQDN) for addressing the MRF server 142. The Application Server 130 can select the MRF server 144 according to the following SIP (signaling) path:

UE←→P-CSCF(SBC)←→S-CSCF←→AS←→MRF (C).

The selected MRF 144 can provide the media service to the communication device 116 according to the following media (bearer) path:

UE←SBC←MRF(C).

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 4:
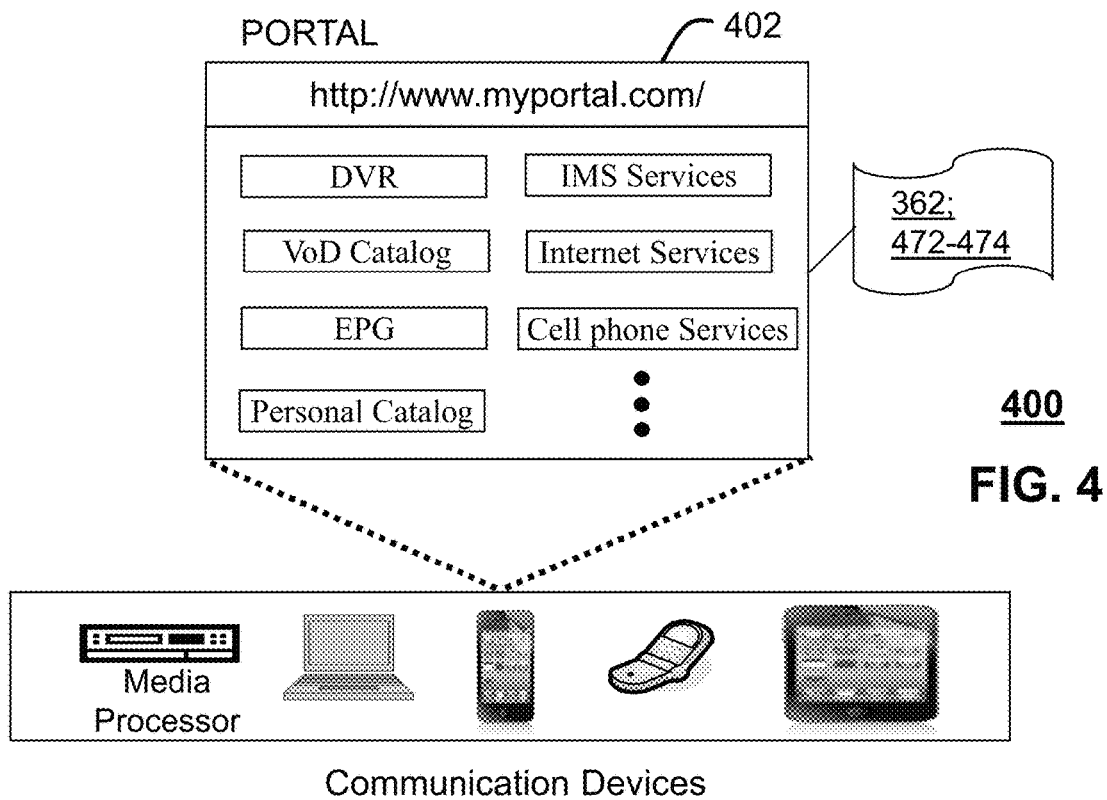
FIG. 4 depicts an illustrative embodiment of a web portal for interacting with the communication systems of FIGS. 1 and 3.

FIG. 4 depicts an illustrative embodiment of a web portal 402 of a communication system 400. Communication system 400 can be overlaid or operably coupled with systems 100 of FIG. 1, and/or communication system 300 as another representative embodiment of systems 100 of FIG. 1 and/or communication system 300. The web portal 402 can be used for managing services of system 100 of FIG. 1 and communication system 300. A web page of the web portal 402 can be accessed by a Uniform Resource Locator (URL) with an Internet browser using an Internet-capable communication device such as those described in FIG. 1 and FIG. 3. The web portal 402 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 402 can also be used for provisioning IMS services described earlier, provisioning Internet services, provisioning cellular phone services, and so on.

The web portal 402 can further be utilized to manage and provision software applications 362, and 472-474 to adapt these applications as may be desired by subscribers and/or service providers of system 100 of FIG. 1 and communication system 300. For instance, users of the services provided by server 130 can log into their on-line accounts and provision the servers 130 with where a user may want to program a user profile, provide contact information to the server to enable it to communication with devices described in FIGS. 1 and 3, and so on. Service providers can log onto an administrator account to provision, monitor and/or maintain the system 100 of FIG. 1 or server 130.

Figure 5:
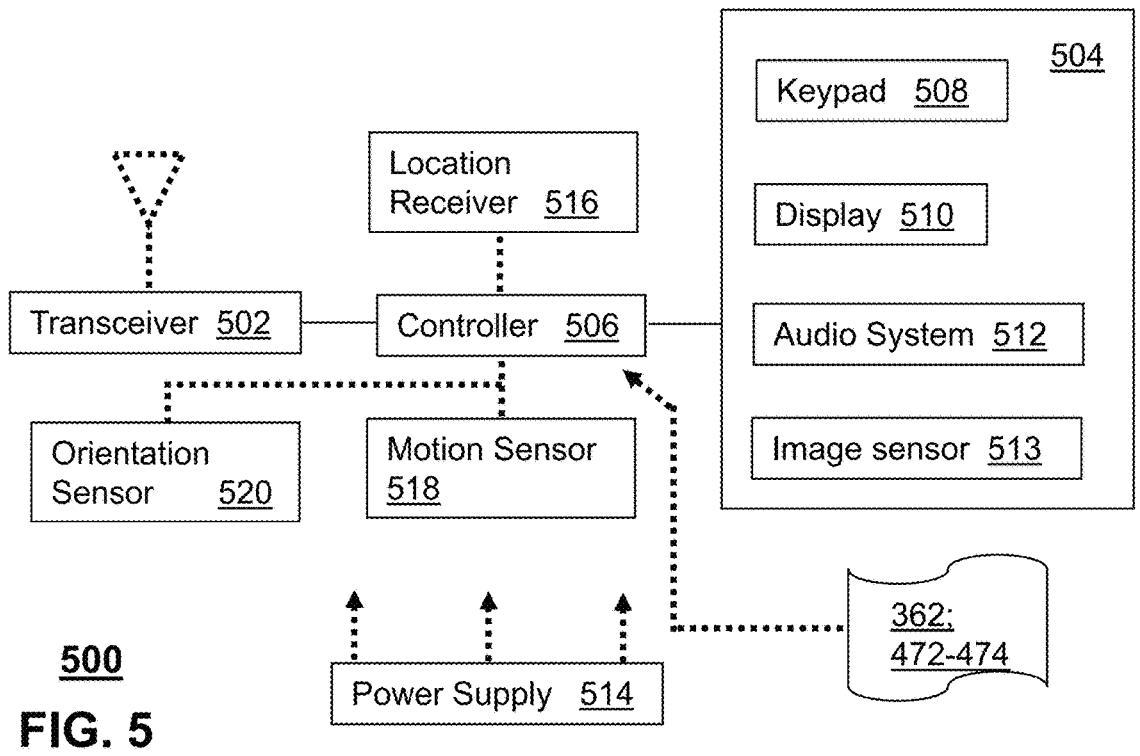
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIGS. 1 and 3 and can be configured to perform portions of method 200 of FIG. 2.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of devices of FIG. 1, or the IMS CDs 301-302 and PSTN CDs 303-305 of FIG. 3. It will be appreciated that the communication device 500 can also represent other devices that can operate in systems of FIG. 1, communication systems 300 of FIGS. 3, such as a gaming console and a media player. In addition, the controller 506 can be adapted in various embodiments to perform the functions 362 and 472-574, respectively.

Upon reviewing the aforementioned embodiments, it would be evident to an artisan with ordinary skill in the art that said embodiments can be modified, reduced, or enhanced without departing from the scope of the claims described below. For example, the Application Server 130 can select MRF servers 140-144 for VoIP services, such as messaging and chat. In another embodiment, the Application Server 130 can select MRF servers 140-144 for video services like DirectTV™. In one embodiment, a service provider can charge graded levels of service based on capabilities of the MRF server 140 that is selected. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
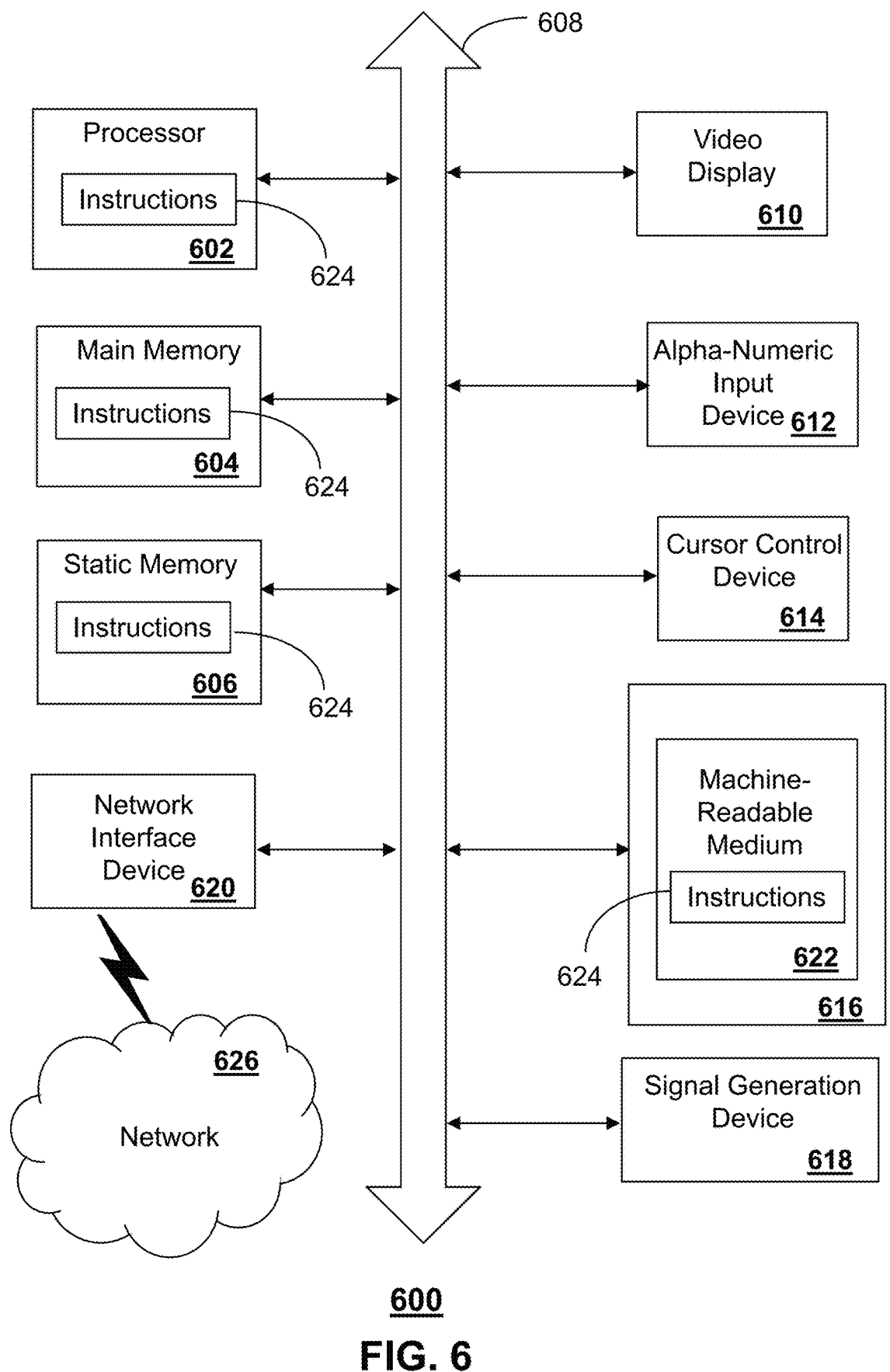
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the Application Server 130, the mobile communication device 116, the MRF Server 140, the MRF Database 132, and other devices of FIGS. 1 and 3. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   causing, by a processing system including a processor of a mobile device, an Internet Protocol (IP) Multimedia Subsystems (IMS) network to transmit a transport protocol message to a server, wherein the transport protocol message enables the server to identify a codec or to determine a media server markup language (MSML) routine;
   based on the transport protocol message enabling the server to identify the codec, receiving, by the processing system of the mobile device and from a first media resource function, a first media service, wherein the first media resource function is accessed by the server using a first operable resource identifier associated with the first media resource function, and wherein the server is configured to obtain the first operable resource identifier by searching a codec table for the first operable resource identifier; and
   based on the transport protocol message enabling the server to determine the MSML routine, receiving, by the processing system of the mobile device and from a second media resource function, a second media service, wherein the second media resource function is accessed by the server using a second operable resource identifier associated with the second media resource function, and wherein the server is configured to obtain the second operable resource identifier by searching an MSML table.

2. The method of claim 1, wherein the codec is determined according to session description protocol information included in the transport protocol message.

3. The method of claim 2, wherein the codec is determined according to a media description that is determined according to the session description protocol information.

4. The method of claim 1, wherein the codec comprises hardware.

5. The method of claim 1, wherein the codec comprises software.

6. The method of claim 1, wherein the first operable resource identifier comprises a domain name.

7. The method of claim 1, wherein the transport protocol message includes a conference request that enables the server to determine the MSML routine.

8. The method of claim 1, wherein the transport protocol message includes capability information that enables the server to identify the codec.

9. The method of claim 1, wherein the transport protocol message relates to a call session.

10. The method of claim 9, wherein the call session comprises a voice-over-IP function.

11. The method of claim 1, wherein the transport protocol message relates to a video call.

12. A non-transitory, machine-readable storage medium, comprising executable instructions that, when executed by a processing system including a processor, facilitate performance of operations, the operations comprising:
   causing a network communicatively coupled to the processing system to send a transport protocol message to a server, wherein the transport protocol message enables the server to identify a codec or to determine a media server markup language (MSML) routine;
   based on the transport protocol message enabling the server to identify the codec, obtaining a first media service from a first media resource function, wherein the server facilitates the obtaining by accessing the first media resource function using a first operable resource identifier associated with the first media resource function, and wherein the server is configured to obtain the first operable resource identifier by searching a codec table; and
   based on the transport protocol message enabling the server to determine the MSML routine, receiving a second media service from a second media resource function, wherein the server facilitates the receiving by accessing the second media resource function using a second operable resource identifier associated with the second media resource function, and wherein the server is configured to obtain the second operable resource identifier by searching an MSML table.

13. The non-transitory, machine-readable storage medium of claim 12, wherein the transport protocol message relates to a voice call or a video call.

14. The non-transitory, machine-readable storage medium of claim 12, wherein the first operable resource identifier comprises a fully qualified domain name.

15. The non-transitory, machine-readable storage medium of claim 12, wherein the transport protocol message comprises a session initiation protocol message.

16. The non-transitory, machine-readable storage medium of claim 12, wherein the codec comprises software.

17. A mobile device, comprising:
   a processing system including a processor; and
   a memory that stores executable instructions that, when executed by the processing system, facilitate performance of operations, the operations comprising:
   causing a network communicatively coupled to the mobile device to send a transport protocol message to a server, wherein the transport protocol message enables the server to identify a codec or to determine a media server markup language (MSML) routine;
   based on the transport protocol message enabling the server to identify the codec, accessing a first media service from a first media resource function, wherein the accessing is based on a first command from the server to the first media resource function, wherein the server accesses the first media resource function using a first operable resource identifier associated with the first media resource function, and wherein the server is configured to obtain the first operable resource identifier by searching a codec table; and
   based on the transport protocol message enabling the server to determine the MSML routine, accessing a second media service from a second media resource function, wherein the accessing the second media service is based on a second command from the server to the second media resource function, wherein the server accesses the second media resource function using a second operable resource identifier associated with the second media resource function, and wherein the server is configured to obtain the second operable resource identifier by searching an MSML table.

18. The mobile device of claim 17, wherein the transport protocol message is associated with a call session.

19. The mobile device of claim 18, wherein the call session is related to a voice call or a video call.

20. The mobile device of claim 17, wherein the codec comprises hardware.

* * * * *